(12) United States Patent
Nguyen

(10) Patent No.: US 11,132,431 B2
(45) Date of Patent: Sep. 28, 2021

(54) PASSWORD INPUT AND IDENTIFICATION SYSTEM, AND PASSWORD INPUT AND IDENTIFICATION METHOD

(71) Applicant: MK GROUP JSC, Hanoi (VN)

(72) Inventor: Khang Trong Nguyen, Hanoi (VN)

(73) Assignee: MK GROUP JSC, Hanoi (VN)

( * ) Notice: Subject to any disclaimer, the term of this patent is extended or adjusted under 35 U.S.C. 154(b) by 138 days.

(21) Appl. No.: 16/692,946

(22) Filed: Nov. 22, 2019

(65) Prior Publication Data

US 2020/0334352 A1    Oct. 22, 2020

(30) Foreign Application Priority Data

Apr. 18, 2019   (VN) .............................. 1-2019-01931

(51) Int. Cl.
| | | |
|---|---|---|
| *G06F 21/30* | (2013.01) | |
| *G06F 21/31* | (2013.01) | |
| *G06F 21/35* | (2013.01) | |
| *G06F 21/36* | (2013.01) | |

(52) U.S. Cl.
CPC .............. *G06F 21/35* (2013.01); *G06F 21/30* (2013.01); *G06F 21/31* (2013.01); *G06F 21/316* (2013.01); *G06F 21/36* (2013.01)

(58) Field of Classification Search
CPC .......... G06F 21/35; G06F 21/30; G06F 21/36; G06F 21/316; G06F 21/31; G07C 9/0069; G07C 9/00682; G07C 9/23
See application file for complete search history.

(56) References Cited

U.S. PATENT DOCUMENTS 7,751,539 B2 * 7/2010 Watano ................. H04W 76/11
                                                             379/93.08
2020/0175147 A1 * 6/2020 Kim ......................... G06F 21/34

FOREIGN PATENT DOCUMENTS

| CN | 105809780 A | 7/2016 |
| EP | 1 046 771 A1 | 10/2000 |
| WO | 2006/097769 A1 | 9/2006 |
| WO | 2019/009509 A1 | 1/2019 |

OTHER PUBLICATIONS

"Reasons to place a time limit on entering login credentials"—Stack Exchange, Jul. 2017 https://security.stackexchange.com/questions/162249/reasons-to-place-a-time-limit-on-entering-login-credentials (Year: 2017).*
"How it Works"—Igloo Home, Feb. 2015 https://www.igloohome.co/en-us/how-it-works/ (Year: 2015).*
Search Report issued to European counterpart application No. 19210822.3 by the EPO dated Jul. 2, 2020 (8 pages).

* cited by examiner

*Primary Examiner* — Randy A Scott
(74) *Attorney, Agent, or Firm* — Hamre, Schumann, Mueller & Larson, P.C.

(57) ABSTRACT

A password input and identification system includes a one-button password input component and a controller. The one-button password input component generates a series of trigger signals in response to a series of triggers that correspond to a series of user-input digits. The controller determines a value of each of the user-input digits by counting a number of the trigger signal(s) that correspond(s) to the user-input digit to serve as the value of the user-input digit. The controller compares the user-input digits with the predetermined password after the input of the user-input digits is finished, and performs a predetermined action when the user-input digits match the predetermined password.

13 Claims, 6 Drawing Sheets

PASSWORD INPUT AND IDENTIFICATION SYSTEM, AND PASSWORD INPUT AND IDENTIFICATION METHOD

CROSS-REFERENCE TO RELATED APPLICATION

This application claims priority of Vietnam Patent Application No. 1-2019-01931, filed on Apr. 18, 2019.

FIELD

The disclosure relates to a system and a method for password input and identification.

BACKGROUND

Referring to FIG. 1, a conventional security device is exemplified as an electronic padlock that includes a numeric keypad on a lock shell, so that a user can input an unlock password through the numeric keypad to unlock the electronic padlock. However, after a long time of use, some keys of the numeric keypad that correspond to the unlock password may be scratched, and the scratched keys may increase the risk of leaking the unlock password. In addition, the presence of the numeric keypad is a hindrance to downsizing the security device.

SUMMARY

Therefore, an object of the disclosure is to provide a password input and identification system that can alleviate at least one of the drawbacks of the prior art.

According to the disclosure, the password input and identification system includes a storage unit, a one-button password input component and a controller. The storage unit stores a predetermined password that has a series of digits each being greater than zero. The one-button password input component is configured to generate a series of trigger signals in response to a series of triggers that correspond to a series of user-input digits. Each of the user-input digits corresponds to at least one of the trigger signals. The controller is coupled to the storage unit for reading the predetermined password, and to the one-button password input component for receiving the trigger signals. The controller is configured to perform a password identification procedure in which: the controller determines a value of each of the user-input digits by counting, for each of the user-input digits, a number of the at least one of the trigger signals that corresponds to the user-input digit and that is received from the one-button password input component to serve as the value of the user-input digit; the controller compares the user-input digits with the predetermined password after the input of the user-input digits is finished; and the controller performs a predetermined action when the user-input digits match the predetermined password.

Another object of the disclosure is to provide a password input and identification method that can alleviate at least one of the drawbacks of the prior art.

According to the disclosure, the password input and identification method includes: by a one-button password input component, generating a series of trigger signals in response to a series of triggers that correspond to a series of user-input digits, each of the user-input digits corresponding to at least one of the trigger signals; by a controller, receiving the trigger signal from the one-button password input component; by the controller, performing a password identification procedure that includes: determining a value of each of the user-input digits by counting, for each of the user-input digits, a number of the at least one of the trigger signals that corresponds to the user-input digit and that is received from the one-button password input component to serve as the value of the user-input digit; comparing the user-input digits with a predetermined password after the input of the user-input digits is finished; and performing a predetermined action when the user-input digits match the predetermined password.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
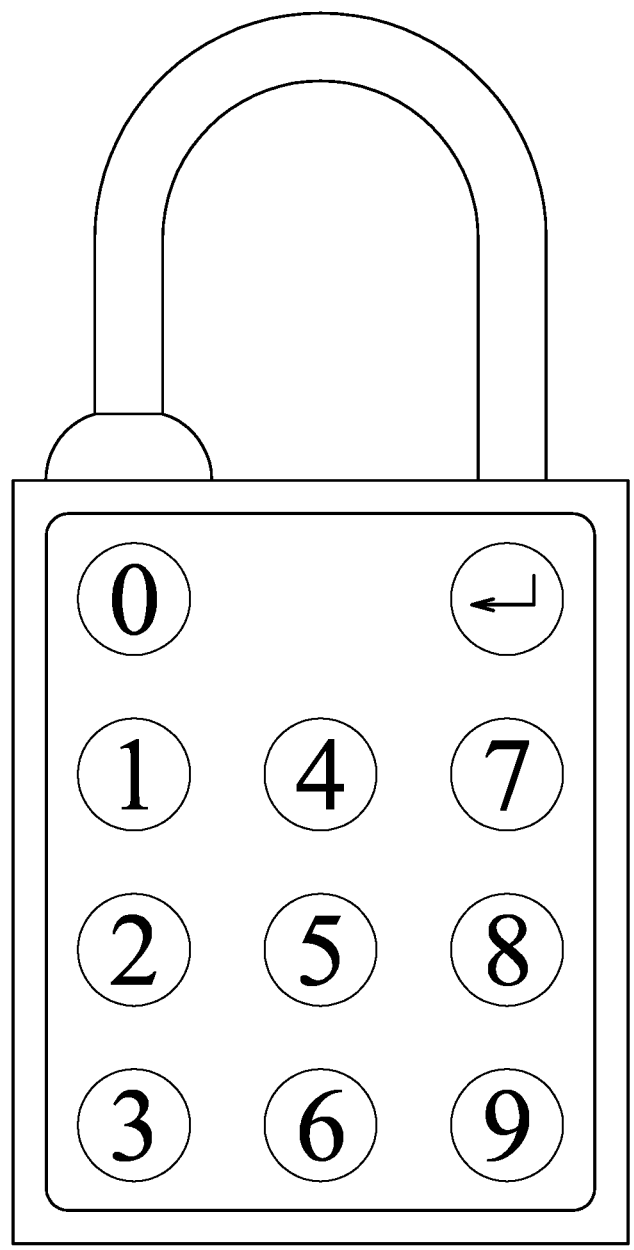
FIG. 1 is a perspective view illustrating a conventional security device that includes a numeric keypad for password input.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
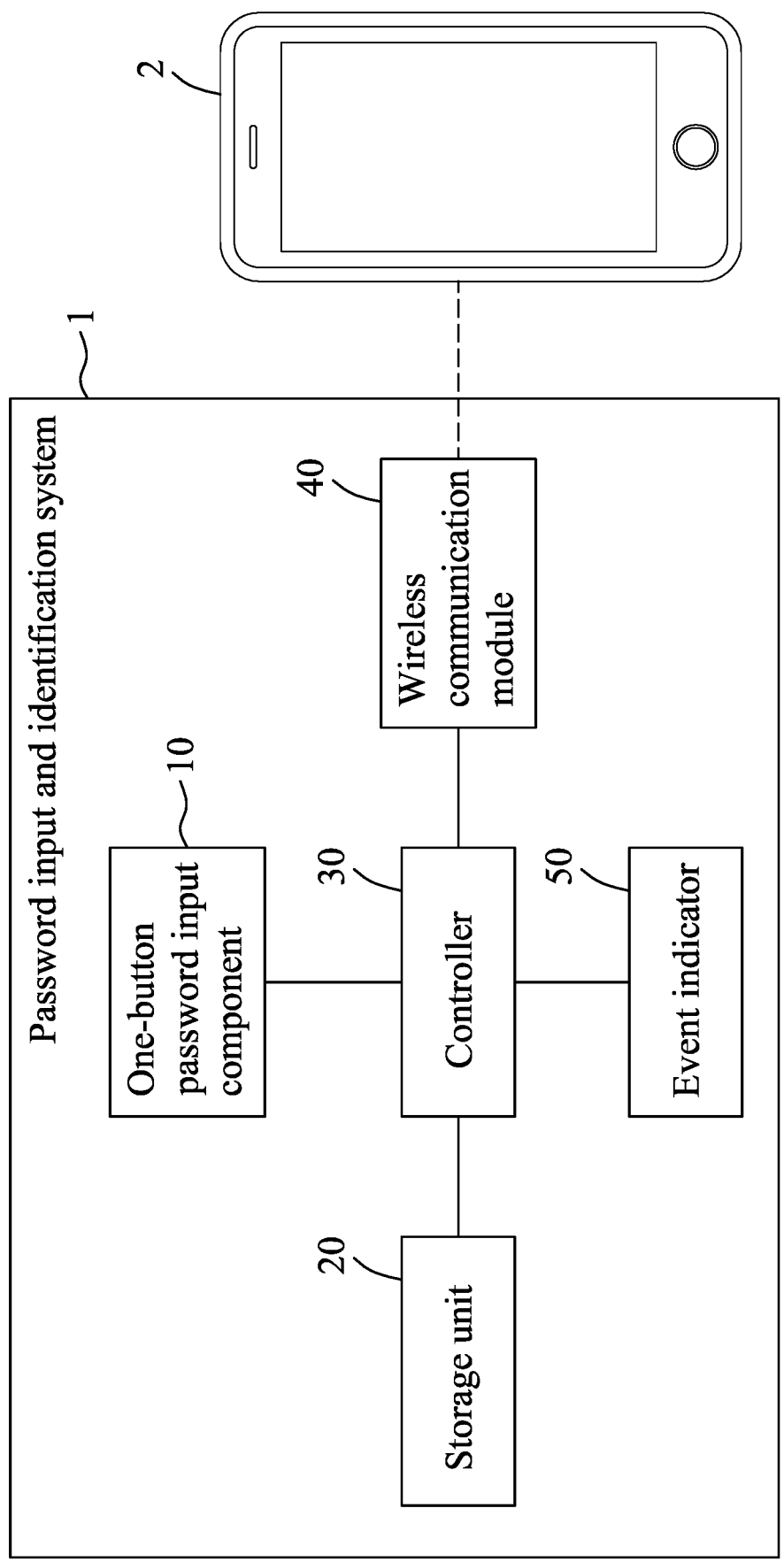
FIG. 2 is a block diagram illustrating an embodiment of the password input and identification system according to this disclosure.

Referring to FIG. 2, the embodiment of the password input and identification system 1 according to this disclosure is shown to include a one-button password input component 10, a storage unit 20, a controller 30, a wireless communication module 40 and an event indicator 50. The password input and identification system 1 is adapted for use with a security system or device. The one-button password input component 10 includes a button to be pressed or clicked by a user, and is configured to generate a series of trigger signals in response to a series of triggers (e.g., consecutive clicks) that are performed solely on the button and that correspond to a series of user-input digits. Each of the user-input digits corresponds to at least one of the trigger signals. The term "button" as used herein may refer to either a physical button or a virtual button which can be triggered by clicking, pressing, touching, or the like. The one-button password input component 10 can be realized by, for example, a resilient metal piece, a piezoelectric component, a resistive/capacitive touch component, etc., and may be made in a form of, for example, a button switch, a keypad, a touch sensitive device, etc., but this disclosure is not limited in this respect. The one-button password input component 10 may work as an electric switching device that outputs an electric signal of a single type when being triggered. It is noted that the one-button password input component 10 may cooperate with other buttons dedicated for different functions to form a multiple-button device.

What is important is that there exists a single button that can be used to enter the entire password (user-input digits) via consecutive triggers performed thereon. The storage unit 20 stores a predetermined password that has a series of digits each being greater than zero, and may be realized by a non-volatile memory device, such as a flash memory module or the like. The controller 30 may be a processor, a microcontroller, or the like, which is coupled to the storage unit 20 for reading the predetermined password, coupled to the one-button password input component 10 for receiving the trigger signals, coupled to the wireless communication module 40 for communication with an external electronic device 2, and coupled to the event indicator 50 for notifying events related to input of the user-input digits. The controller 30 is configured to perform a password identification procedure in which the controller 30 identifies/determines the values of the user-input digits input through the one-button password input component 10 one by one in order, and performs a predetermined action when the user-input digits match the predetermined password stored in the storage unit 20. In this embodiment, the event indicator 50 is exemplified as an LED (light emitting diode) indicator, which can emit light in different colors in different manners to indicate different events, but this disclosure is not limited in this respect. For example, the event indicator 50 may be a screen, or a speaker, or a combination thereof in other embodiments, so as to output messages related to the event by text, images and/or sound.

The external electronic device 2 may be, for example, a smartphone, a tablet computer, etc., which can execute an application program corresponding to the password input and identification system 1 to set the predetermined password via wireless communication (e.g., Bluetooth, WiFi, etc.).

Figure 3:
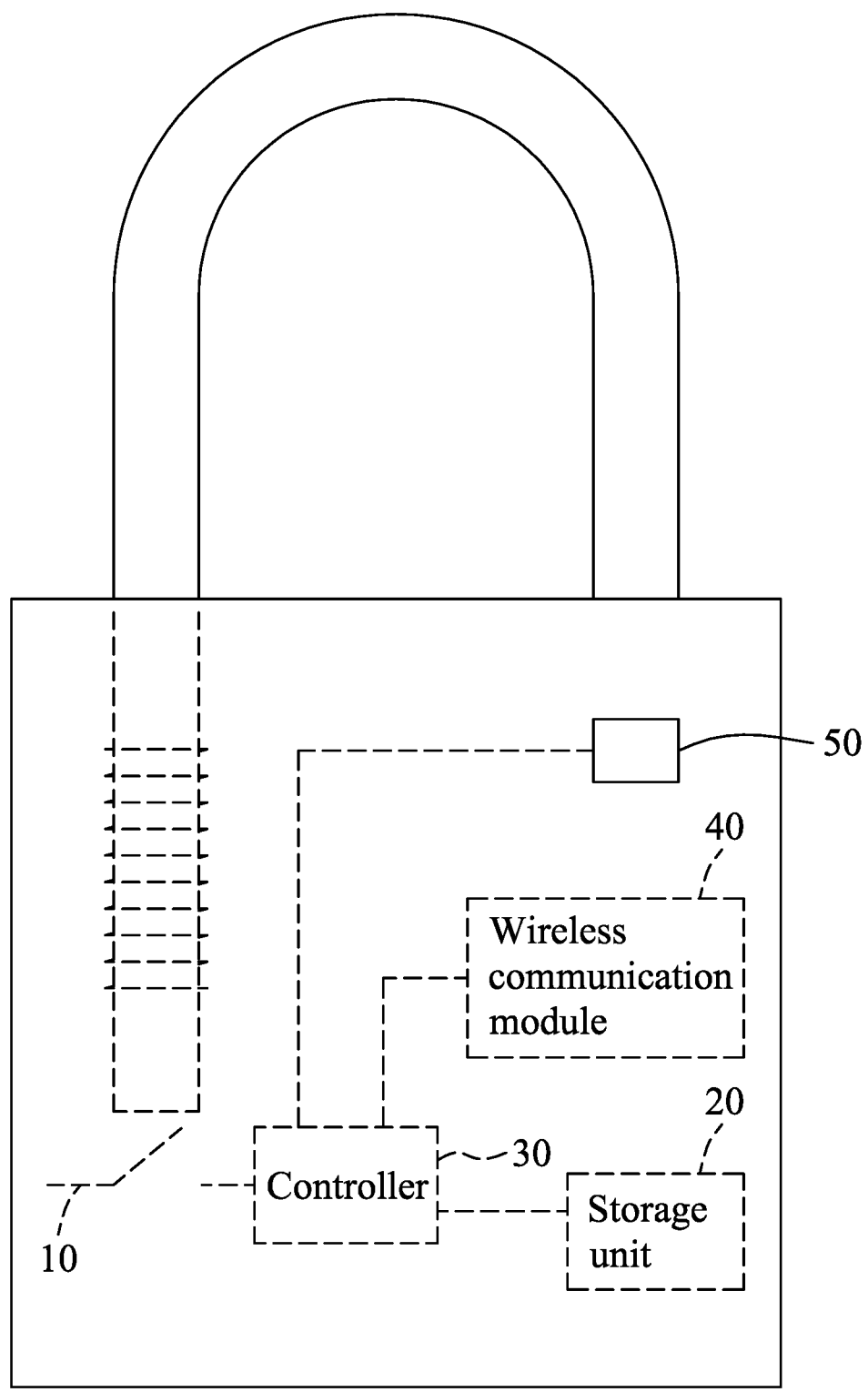
FIG. 3 is a schematic diagram exemplarily illustrating an electronic padlock implementing the embodiment.

In one application, the password input and identification system 1 is applied to an electronic padlock, as shown in FIG. 3. The one-button password input component 10, the storage unit 20 and the controller 30 may be disposed within a lock shell of the electronic padlock. The electronic padlock is made such that a user may consecutively click a shackle of the electronic padlock to trigger the one-button password input component 10 to enter the user-input digits. When the user-input digits match the predetermined password stored in the storage unit 20, the controller 30 performs an unlock operation on the electronic padlock, which is the predetermined action in this application.

Figure 4:
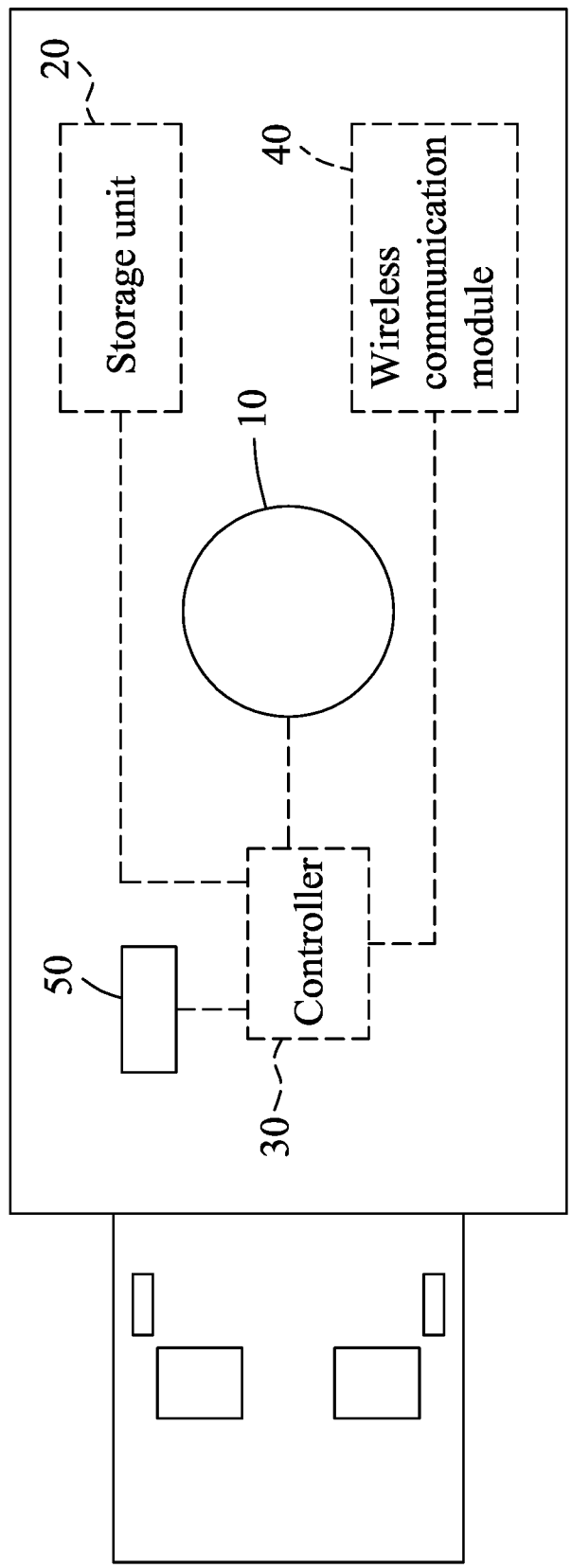
FIG. 4 is a schematic diagram exemplarily illustrating a USB drive implementing the embodiment.

In one application, the password input and identification system 1 is applied to a USB (universal serial bus) drive, as shown in FIG. 4. The one-button password input component 10 may be exposed from a housing of the USB drive, a part of storage space of the USB drive may be used to store the predetermined password, and the controller 30 may locate within the housing of the USB drive. When a user enters user-input digits that match the predetermined password by pressing the one-button password input component 10, the controller 30 permits the user to access data stored in the USB drive, which is the predetermined action in this application.

Figure 5A:
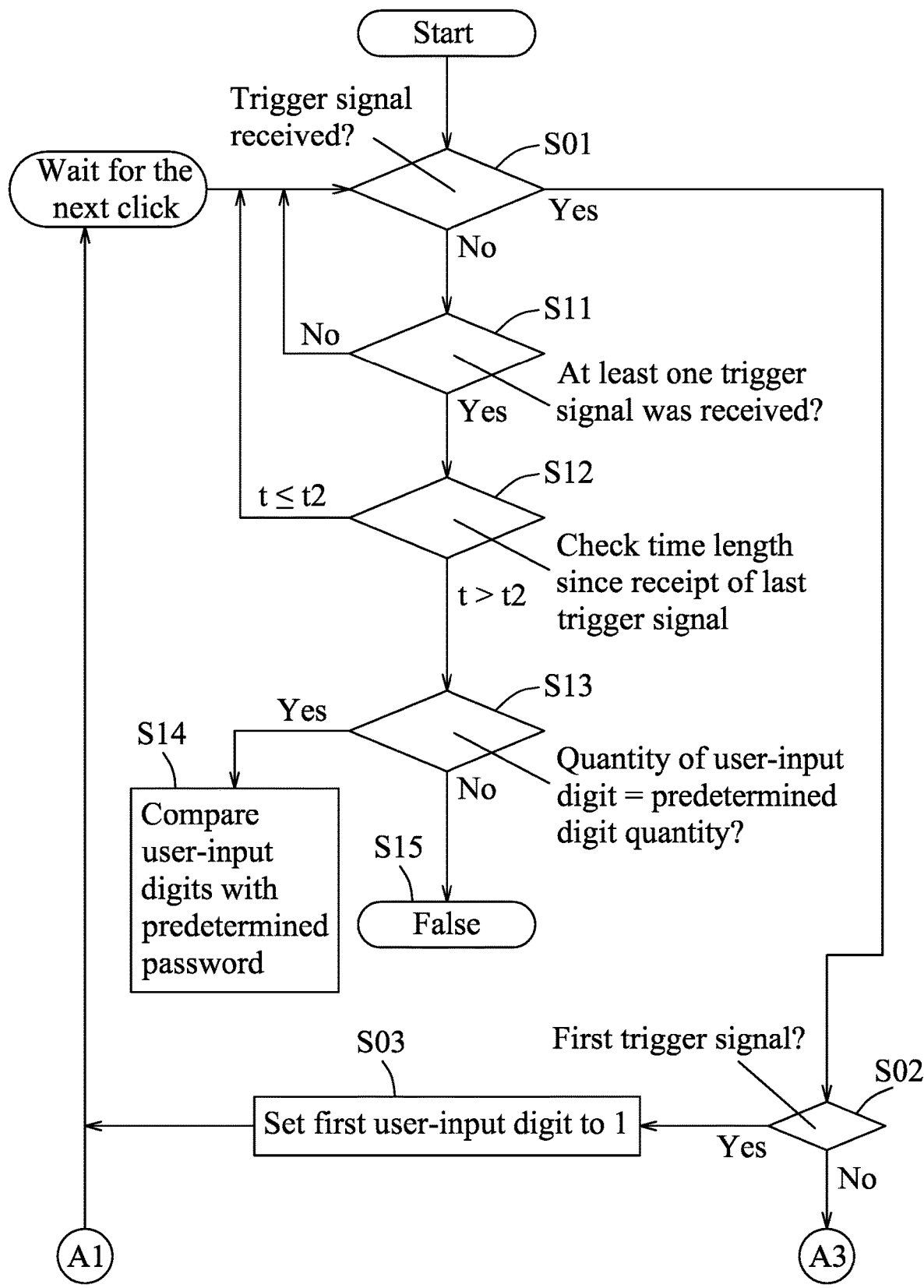
FIGS. 5A and 5B cooperatively provide a flow chart illustrating steps of a password identification procedure of an embodiment of the password input and identification method according to this disclosure.
Figure 5B:
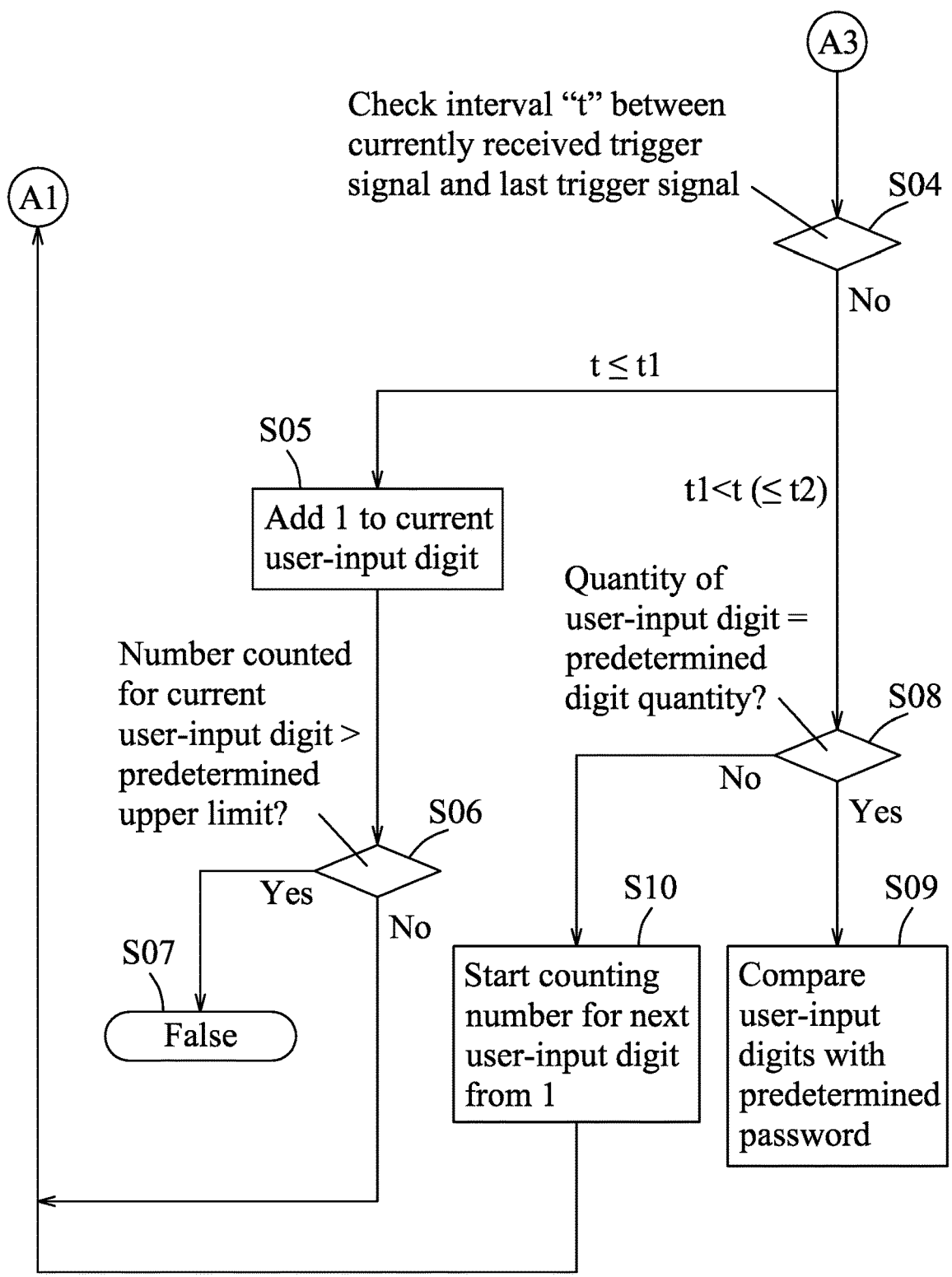

FIGS. 5A and 5B cooperatively form a flow chart illustrating steps of a password identification procedure of the password input and identification method according to this disclosure. The password identification procedure may be activated by clicking the button of the one-button password input component 10 one time.

In step S01, the controller 30 checks whether a trigger signal that results from a click on the one-button password input component 10 is received. The flow goes to step S02 when affirmative, and goes to step S11 when otherwise. Upon receipt of the trigger signal, the controller 30 may cause the event indicator 50 to flash in blue light.

In step S02, the controller 30 checks whether the trigger signal is the first trigger signal received in the current password identification procedure (i.e., whether the trigger signal is the very first trigger signal received after the current password identification procedure has been activated). In other words, the controller 30 determines, upon receipt of each trigger signal that corresponds to a click on the one-button password input component 10, whether the trigger signal is the first trigger signal received in the current password identification procedure. The flow goes to step S03 when affirmative, and goes to step S04 when otherwise.

In step S03, the controller 30 sets the first one of the user input digits to one, so as to start counting a number of the trigger signal(s) that correspond(s) to the first one of the user-input digits and that is/are received from the one-button password input component 10 to serve as a value of the first one of the user-input digits. Then, the controller 30 waits for the next click, and the flow goes back to step S01.

When the flow goes to step S04, which means that the controller 30 is counting a number for one of the user-input digits (referred to as "current user-input digit" hereinafter) (the current user-input digit would be the first one of the user-input digits if step S04 is performed for the first time during the current password identification procedure), the controller 30 determines a time interval between receipt of the trigger signal which is currently (or most recently) received and receipt of an immediately previous trigger signal. It is noted that, when it is determined in step S01 that the trigger signal is received, the controller 30 starts timing until receipt of the next trigger signal. When the time interval is not greater than a first predetermined time length (t1), the flow goes to step S05, where the controller 30 adds one to the number counted for the current user-input digit, and the flow subsequently goes to step S06. When the time interval is greater than the first predetermined time length (t1), the flow goes to step S08.

In this embodiment, each of the digits of the predetermined password has a predetermined upper limit, which means that each digit of the predetermined password will not be greater than the predetermined upper limit, so it will not take a long time for the user to enter the password. In a case that the predetermined upper limit is five, each digit of the predetermined password can only be one, two, three, four or five. In step S06, the controller 30 compares the number counted for the current user-input digit with the predetermined upper limit. When the number counted for the current user-input digit is greater than the predetermined upper limit, which means an overflow of clicks has occurred for the current user-input digit (i.e., there is an excess number of clicks), the controller 30 determines that the user-input digits do not match the predetermined password, and the flow goes to step S07, where the controller 30 ends the password identification procedure, and provides a false password identification result. In this embodiment, the controller 30 provides the false password identification result by causing the event indicator 50 to flash in red light.

In some implementations, the predetermined password has a predetermined digit quantity corresponding to a number of the digits in the predetermined password. In such a case, step S08 can be performed, but this disclosure is not limited to such. The flow goes from step S04 to step S08 because the time interval between the current trigger signal and the immediately previous trigger signal is greater than the first predetermined time length (t1), and in step S08, the controller 30 compares a quantity of the user-input digits (that have been entered thus far) with the predetermined digit quantity (essentially determining whether the current user-input digit corresponds to the last digit of the predetermined password). When the quantity of the user-input digits is identical to the predetermined digit quantity, the controller 30 determines that the input of the user-input digits is finished, and the flow goes to step S09, where the controller 30 compares the user-input digits respectively with the digits of the predetermined password.

When the quantity of the user-input digits is not identical to the predetermined digit quantity, the flow goes to step S10, where the controller 30 finishes the counting of the number for the current user-input digit, determines the value of the current user-input digit as the number, thus counted, of the trigger signal(s) that correspond(s) to the current user-input digit and that was/were received from the one-button password input component 10, and starts counting the number of trigger signal(s) for the next user-input digit (the new current user-input digit) from one (i.e., setting the next user-input digit to one). Then, the controller 30 waits for the next click and the flow goes back to step S01.

The flow goes from S01 to step S11 upon determining that no trigger signal is received, and in step S11, the controller 30 checks whether at least one trigger signal was received in the current password identification procedure. The flow goes to step S12 when affirmative, and goes back to step S01 when otherwise.

In step S12, the controller determines whether a time length timed from receipt of the most recent trigger signal has exceeded a second predetermined time length (t2) which is greater than the first predetermined time length (t1). When affirmative, the controller 30 determines that the input of the user-input digits is finished, and the flow goes to step S13. Otherwise, the flow goes back to step S01.

In step S13, the controller 30 compares the quantity of the user-input digits (that have been entered thus far) with the predetermined digit quantity (essentially determining whether the current user-input digit corresponds to the last digit of the predetermined password). When the quantity of the user-input digits is identical to the predetermined digit quantity, the flow goes to step S14, where the controller 30 compares the user-input digits respectively with the digits of the predetermined password. When the quantity of the user-input digits is different from the predetermined digit quantity (i.e., the quantity of the user-input digits that have been entered thus far is less than the quantity of the digits of the predetermined password), the flow goes to step S15, where the controller 30 ends the password identification procedure, and provides the false password identification result.

When the controller 30 determines that each of the user-input digits is identical to the respective one of the digits of the predetermined password in step S09 or S14, the controller 30 ends the password identification procedure, and performs the predetermined action, which includes causing the event indicator 50 to flash in green light in this embodiment. Otherwise, the controller 30 ends the password identification procedure, and provides the false password identification result.

To explain the operation of the password input and identification system 1 for easy understanding, an exemplary implementation where the password input and identification system 1 is applied to the electronic padlock as shown in FIG. 3 and the predetermined password is composed of four digits "1-2-3-4" is described herein. When a user wishes to unlock the electronic padlock, the user may activate the password identification procedure, and then click the shackle one time (corresponding to the first digit "1"), pause for a while (t2≥t>t1), quickly click (t≤t1) the shackle two times (corresponding to the second digit "2"), pause for a while, quickly click the shackle three times (corresponding to the third digit "3"), pause for a while, and quickly click the shackle four times (corresponding to the fourth digit "4"). Then, the user may simply wait for the second predetermined time length (t2), by the end of which the controller 30 automatically checks if the digits inputted by clicking the shackle (i.e., the user-input digits) match the predetermined password (S12→S13→S14). Or, the user may pause for a while after inputting the fourth digit, and then click the shackle one more time, causing the controller 30 to check if the user-input digits match the predetermined password (S04→S08→S09). The controller 30 unlocks the electronic padlock upon determining that the user-input digits match the predetermined password. In a case that the user stops clicking after inputting any one of the first to third digits for the second predetermined time length, the controller 30 provides the false password identification result (S12→S13→S15).

The first and second predetermined time lengths (t1, t2) may be set according to the designer's experience and knowledge such that the user feels comfortable performing quick consecutive clicks, and does not have to wait too long before the controller 30 automatically checks if the user-input digits match the predetermined password. In one example, the first predetermined time length (t1) may be set as 800 ms, and the second predetermined time length t2 may be set as 2500 ms, but this disclosure is not limited in this respect.

In summary, the password input and identification system 1 according to this disclosure can identify user-input digits entered via the one-button password input component 10 by counting, for each user-input digit, the number of the trigger signals resulting from the clicks on the one-button password input component 10 for the user-input digit, and distinguish the clicks for inputs of different user-input digits based on the settings of the first and second predetermined time lengths (t1, t2). Since the one-button password input component 10 can be used to enter different user-input digits via only a single button, the password will not be leaked by the appearance of the button. Furthermore, the application that employs the password input and identification system of this disclosure may have more flexibility in size because only one button is required for password input.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A password input and identification system comprising:
a non-transitory storage unit storing a predetermined password that has a series of digits each being greater than zero;
a one-button password input component configured to generate a series of trigger signals in response to a series of triggers that correspond to a series of user-input digits, each of the user-input digits corresponding to at least one of the trigger signals; and
a controller coupled to said non-transitory storage unit for reading the predetermined password, and to said one-button password input component for receiving the trigger signals;
wherein said controller is configured to perform a password identification procedure in which:
said controller determines a value of each of the user-input digits by counting, for each of the user-input digits, a number of the at least one of the trier signals that corresponds to said each of the user-input digits and that is received from said one-button password input component to serve as the value of said each of the user-input digits;
said controller determines that the user-input digits do not match the predetermined password and ends the password identification procedure when the number counted for said each of the user-input digits is greater than a predetermined upper limit;
said controller compares the user-input digits with the predetermined password after the input of the user-input digits is finished; and
said controller performs a predetermined action when the user-input digits match the predetermined password;
wherein, in the password identification procedure:
for each of the trigger signals, said controller starts timing upon receipt of said each of the trigger signals until receipt of another one of the trigger signals immediately following said each of the trigger signals;
said controller determines the values for the user-input digits one by one in order; and
when determining the value for one of the user-input digits, said controller adds one to the number counted for said one of the user-input digits upon receipt of one of the trigger signals which is spaced apart from receipt of an immediately previous one of the trigger signals by a time interval smaller than a first predetermined time length.

2. The password input and identification system of claim 1, wherein, in the password identification procedure:
said controller determines, up on receipt of each of the trigger signals, whether said each of the trigger signals is a first one of the trigger signals received in the password identification procedure; and
said controller counts, upon determining that said each of the trigger signals is the first one of the trigger signals received in the password identification procedure, the number for a first one of the user-input digits from one.

3. The password input and identification system of claim 1, wherein each of the digits of the predetermined password is not greater than the predetermined upper limit;
wherein, in the password identification procedure:
when determining the value for one of the user-input digits, said controller compares the number counted for said one of the user-input digits with the predetermined upper limit after adding one to the number counted for said one of the user-input digit.

4. The password input and identification system of claim 1, wherein, in the password identification procedure:
when determining the value for one of the user-input digits which does not correspond to a last one of the digits of the predetermined password, said controller finishes counting the number for said one of the user-input digits, and starts counting the number for one of the user-input digits immediately following said one of the user-input digits from one upon receipt of one of the trigger signals which is paced apart from receipt of an immediately previous one of the trigger signals by a time interval between the first predetermined time length and a second predetermined time length that is greater than the first predetermined time length.

5. The password input and identification system of claim 4, wherein, in the password identification procedure:
when determining the value for one of the user-input digits which corresponds to the last one of the digits of the predetermined password, said controller determines that the input of the user-input digits is finished upon receipt of one of the trigger signals which is spaced apart from receipt of an immediately previous one of the trigger signals by a time interval between the first predetermined time length and the second predetermined time length.

6. The password input and identification system of claim 4, wherein, in the password identification procedure, said controller determines that the input of the user-input digits is finished when a time length timed from receipt of a most recent one of the trigger signals has exceeded the second predetermined time length.

7. The password input and identification system of claim 1, wherein the predetermined password has a predetermined digit quantity corresponding to a number of the digits in the predetermined password, and, in the password identification procedure:
said controller compares the user-input digits with the predetermined password by:
comparing a quantity of the user-input digits with the predetermined digit quantity; and
comparing the user-input digits respectively with the digits of the predetermined password when the quantity of the user-input digits is identical to the predetermined digit quantity; and
said controller performs the predetermined action when each of the user-input digits is identical to the respective one of the digits of the predetermined password.

8. The password input and identification system of claim 7, wherein, in the password identification procedure, said controller ends the password identification procedure when the quantity of the user-input digits is different from the predetermined digit quantity.

9. A password input and identification method, comprising:
by a one-button password input component, generating a series of trigger signals in response to a series of triggers that correspond to a series of user-input digits, each of the user-input digits corresponding to at least one of the trigger signals;

by a controller, receiving the trigger signals from the one-button password input component;

by the controller, performing a password identification procedure that includes:

determining a value of each of the user-input digits by counting for each of the user-input digits, a number of the at least one of the trigger signals that corresponds to said each of the user-input digits and that is received from the one-button password input component to serve as the value of said each of the user-input digits;

determining that the user-input digits do not match the predetermined password and ending the password identification procedure when the number counted for said each of the user-input digits is greater than a predetermined upper limit;

comparing the user-input digits with a predetermined password after the input of the user-input digits is finished; and performing a predetermined action when the user-input digits match the predetermined password;

wherein the password identification procedure further includes:

for each of the trigger signals, starting timing upon receipt of said each of the trigger signals until receipt of another one of the trigger signals immediately following said each of the trigger signals;

determining the values for the user-input digits one by one in order; and when determining the value for one of the user-input digits, adding one to the number counted for said one of the user-input digits upon receipt of one of the trigger signals which is spaced apart from receipt of an immediately previous one of the trigger signals by a time interval smaller than a first predetermined time length.

10. The password input and identification method of claim 9, wherein the password identification procedure further includes:

determining upon receipt of each of the trigger signals, whether said each of the trigger signals is a first one of the trigger signals received in the password identification procedure; and counting upon determining that said each of the trigger signals is the first one of the trigger signals received in the password identification procedure, the number for a first one of the user-input digits from one.

11. The password input and identification method of claim 9, wherein each of the digits of the predetermined password is not greater than the predetermined upper limit, and the password identification procedure further includes:

when determining the value for one of the user-input digits, comparing the number counted for said one of the user-input digits with the predetermined upper limit after adding one to the number counted for the said one of the user-input digits.

12. The password input and identification method of claim 9, wherein the password identification procedure further includes:

when determining the value for one of the user-input digits which does not correspond to a last one of the digits of the predetermined password, finishing counting the number for said one of the user-input digits, and starting counting the number for one of the user-input digits immediately following said one of the user-input digits from one upon receipt of one of the trigger signals which is spaced apart from receipt of an immediately previous one of the trigger signals by a time interval between the first predetermined time length and a second predetermined time length that is greater than the first predetermined time length.

13. The password input and identification method of claim 9, wherein the predetermined password has a predetermined digit quantity corresponding to a number of the digits in the predetermined password;

wherein the comparing the user-input digits with the predetermined password includes:

comparing a quantity of the user-input digits with the predetermined digit quantity; and comparing the user-input digits respectively with the digits of the predetermined password when the quantity of the user-input digits is identical to the predetermined digit quantity; and wherein the password identification procedure further includes: performing the predetermined action when each of the user-input digits is identical to the respective one of the digits of the predetermined password.

* * * * *